(12) United States Patent
Nair

(10) Patent No.: US 10,217,114 B1
(45) Date of Patent: Feb. 26, 2019

(54) METHODS AND SYSTEMS FOR PROVIDING LABELS TO PREVENT COUNTERFEITING OF PRODUCTS

(71) Applicant: Ennoventure, Inc., Washington, DC (US)

(72) Inventor: Shalini Vanaja Nair, Thiruvananthapuram (IN)

(73) Assignee: Ennoventure, Inc., Washington, DC (US)

(*) Notice: Subject to any disclaimer, the term of this patent is extended or adjusted under 35 U.S.C. 154(b) by 0 days.

(21) Appl. No.: 16/114,200

(22) Filed: Aug. 27, 2018

(51) Int. Cl.
*H04L 9/32* (2006.01)
*G06F 21/60* (2013.01)
(Continued)

(52) U.S. Cl.
CPC ....... *G06Q 30/0185* (2013.01); *G06F 21/602* (2013.01); *G07D 7/004* (2013.01);
(Continued)

(58) Field of Classification Search
CPC ............ G06Q 30/0185; G06Q 2220/00; H04L 9/3231; G06F 21/602; G07D 7/004; G07D 7/0043; G07D 7/0047
See application file for complete search history.

(56) References Cited

U.S. PATENT DOCUMENTS 5,719,939 A * 2/1998 Tel .......................... G06K 9/00
  283/107
6,788,800 B1 * 9/2004 Carr ....................... G06Q 10/00
  235/375
(Continued)

FOREIGN PATENT DOCUMENTS

DE 102005061126 12/2005
DE 102013212655 6/2013
JP 2001134733 5/2001

OTHER PUBLICATIONS

Bonev, Slavtcho, and Bernhard Wirnitzer. "Security printing for product packaging in industrial printing applications." Proceedings of 35th International Research Conference of IARIGAI. 2008. (Year: 2008).*

*Primary Examiner* — Michael Simitoski
(74) *Attorney, Agent, or Firm* — Kanika Radhakrishnan; Evergreen Valley Law Group

(57) ABSTRACT

Embodiments provide methods and systems for providing labels to prevent counterfeiting of products. In an embodiment, the method includes accessing, by a processor, one or more biometric data associated with a manufacturer. The one or more biometric data include fingerprint data, iris pattern, facial pattern, heart rate, electrical activity of skeletal muscles and deoxyribonucleic acid (DNA) data that are encrypted using a first encryption method for generating a first encrypted data. From the first encrypted data, a biometric pattern is extracted. The biometric pattern is appended with one or more product identification codes for generating a product encoded data. The product encoded data is encrypted using a second encryption method. An error checksum data is appended to the second encrypted data and a unique identifier is prefixed to the second encrypted data. The second encrypted data is added to product labels of the products for securing the products from counterfeiting.

20 Claims, 11 Drawing Sheets

(51) Int. Cl.
*G06Q 30/00* (2012.01)
*G07D 7/004* (2016.01)
*G07D 7/0043* (2016.01)
*G07D 7/0047* (2016.01)

(52) U.S. Cl.
CPC .......... *G07D 7/0043* (2017.05); *G07D 7/0047* (2017.05); *H04L 9/3231* (2013.01); *G06Q 2220/00* (2013.01)

(56) References Cited

U.S. PATENT DOCUMENTS

| | | | |
|---|---|---|---|
| 6,904,525 B1 * | 6/2005 | Berson | G06K 19/086 705/59 |
| 6,996,543 B1 * | 2/2006 | Coppersmith | G06Q 10/087 235/385 |
| 7,846,520 B2 | 12/2010 | Azakami et al. | |
| 8,476,920 B2 | 7/2013 | Brown et al. | |
| 9,727,899 B2 | 8/2017 | Kesavan et al. | |
| 2002/0129251 A1 * | 9/2002 | Itakura | G06K 19/06037 713/176 |
| 2003/0024636 A1 | 2/2003 | Lia | |
| 2003/0117262 A1 * | 6/2003 | Anderegg | G06K 19/06046 340/5.53 |
| 2003/0141358 A1 * | 7/2003 | Hudson | G06K 19/06028 235/375 |
| 2004/0003295 A1 * | 1/2004 | Elderfield | G07C 9/00087 713/176 |
| 2005/0038756 A1 * | 2/2005 | Nagel | G06K 19/086 705/76 |
| 2005/0143249 A1 | 6/2005 | Ross | |
| 2005/0150964 A1 | 7/2005 | Lo | |
| 2005/0156318 A1 * | 7/2005 | Douglas | B82Y 10/00 257/761 |
| 2005/0182729 A1 | 8/2005 | Kananen | |
| 2005/0234823 A1 * | 10/2005 | Schimpf | G06Q 10/08 705/50 |
| 2007/0198569 A1 | 8/2007 | Johnston | |
| 2011/0197484 A1 | 8/2011 | Lin | |
| 2016/0189573 A1 | 6/2016 | Bush | |
| 2016/0240112 A1 | 8/2016 | Liu | |
| 2017/0203601 A1 | 7/2017 | Yashiki | |

* cited by examiner

| PRODUCTS | ID | BIOMETRIC PATTERN | BARCODE/SERIA-LIZATION CODE | PRODUCT INFORMATION | ERROR CHECKSUM DATA |
|---|---|---|---|---|---|
| PRODUCT 1 | SM-R01P | \X00\X00\RIHDR\X00\X00\X | SB10973214658 | SOAP | 1 |
| PRODUCT 2 | FM-D002 | XE6\X9E\X97\XE6 | 0712134567891 | WATER BOTTLE | 1 |
| PRODUCT 3 | PNM-C131 | XBC\XFE\XBC | ER-11746 | PENCIL | 0 |
| ... | | | | | |
| PRODUCT N | NBM-T011 | \0\0\0\X7F\0\0\0 | 00018-090-000-012 | NOTEBOOK | 1 |

FIG. 4B

METHODS AND SYSTEMS FOR PROVIDING LABELS TO PREVENT COUNTERFEITING OF PRODUCTS

TECHNICAL FIELD

The present disclosure relates to product authentication and, more particularly to, methods and systems for providing labels to prevent counterfeiting of products.

BACKGROUND

With the advent of technology, there has been a tremendous change in purchasing trends of the consumers and sellers have expanded the market manifold to meet the demands of the consumers. However, some of the sellers have taken unfair advantage of the consumer purchasing trends to sell counterfeiting or fake products. Hence, significant portion of the products sold via online stores or physical stores are counterfeit products. In one example scenario, products manufactured by a producer may be distributed globally through a supply chain. The supply chain may include intermediaries, such as retailers, wholesellers, authorized or non-authorized vendors, etc. In such a scenario, during a transit or storage, the products may be replicated by counterfeiters. As the products are globally distributed, there may be trading between one or more countries through parallel importing of the products. In such scenario, rate of counterfeiting of products may be high as products sold through parallel importing may lack consent of the actual producer. At present, counterfeit products have become one of the major issues encountered by both consumers and sellers. Such counterfeiting of products, for example, pharmaceutical items or edible products may cause life-threatening consequences. In addition, the consumer may not be provided with proper customer support from the producer due to lack of authenticity of the product purchased.

Both the manufacturers and the consumers are affected directly or indirectly due to counterfeiting. In an example scenario, a manufacturer may not be aware of his products being counterfeited and a consumer may purchase one of these products and may later realize that the product is not genuine. The consumer may seek for customer support from the manufacturer. However, customer support may be denied by the manufacturer due to lack of product authenticity. In such a scenario, the consumer loses trust in the manufacturer and may not continue to purchase further from the same manufacturer in future which may likely to hinder the business of the manufacturer.

The manufacturer may provide a customer support to process a refund to the customer. However, some other customers may be encouraged to seek refunds by means of using counterfeited products. Moreover, if a consumer had consumed counterfeited medicines or edible foods, then consequences can be hazardous to health or even life-threatening. Although, there are measures adopted to prevent counterfeiting by law enforcement, it becomes tedious for the law enforcement agencies to track the supply chain in a large market filled with counterfeit products. On the other hand, verifying counterfeit products may not be possible for a consumer as the counterfeit products may be almost same as the genuine products.

In view of the above, there is a need to overcome issues due to counterfeiting of products. Moreover, there is a need to provide techniques for authentication of the products to protect the products against counterfeiting. Furthermore, there is a need to provide techniques for tracking the products that can help to address parallel imports.

SUMMARY

Various embodiments of the present disclosure provide methods and systems for providing labels to prevent counterfeiting of products.

In an embodiment, a method is disclosed. The method includes accessing, by the processor, one or more biometric data associated with a manufacturer. The method includes encrypting, by the processor, the one or more biometric data for generating a first encrypted data using a first encryption method selected from a set of encryption methods. The method includes extracting, by the processor, a biometric pattern from the first encrypted data. The biometric pattern includes one or more recurring data sequences in the first encrypted data. The method includes appending, by the processor, one or more product identification codes to the biometric pattern for generating a product encoded data, wherein the one or more product identification codes correspond to a product of the manufacturer. The method includes encrypting, by the processor, the product encoded data for generating a second encrypted data using a second encryption method selected from the set of encryption methods. The method further includes facilitating adding, by the processor, the second encrypted data to an image of a product label of the product before printing of the product label for securing the product from counterfeiting.

In another embodiment, a server system is disclosed. The server system includes a memory comprising stored instructions and a processor. The processor is configured to execute the stored instructions. The processor is configured to cause the server system to perform accessing one or more biometric data associated with a manufacturer. The server system is caused to perform encrypting the one or more biometric data for generating a first encrypted data using a first encryption method selected from a set of encryption methods. The server system is caused to perform extracting a biometric pattern from the first encrypted data. The biometric pattern includes one or more recurring data sequences in the first encrypted data. The server system is caused to perform appending one or more product identification codes to the biometric pattern for generating a product encoded data, wherein the one or more product identification codes correspond to a product of the manufacturer. The server system is caused to perform encrypting the product encoded data for generating a second encrypted data using a second encryption method selected from the set of encryption methods. The server system is further caused to perform facilitating adding the second encrypted data to an image of a product label of the product before printing of the product label for securing the product from counterfeiting.

In yet another embodiment, a method is disclosed. The method includes accessing, by a processor, one or more biometric data associated with a manufacturer. The method includes encrypting, by the processor, the one or more biometric data for generating a first encrypted data using a first encryption method selected from a set of encryption methods. The method includes extracting, by the processor, a biometric pattern from the first encrypted data. The biometric pattern includes one or more recurring data sequences in the first encrypted data. The method includes appending, by the processor, one or more product identification codes to the biometric pattern for generating a product encoded data, wherein the one or more product identification codes correspond to the product of the manufacturer. The method includes encrypting, by the processor, the product encoded data for generating a second encrypted data using a second encryption method selected from the set of encryption methods. The method includes appending, by the processor, an error checksum data to the second encrypted data. The method includes upon appending the error checksum data, accessing, by the processor, an image of a product label corresponding to the product. The method includes generating, by the processor, a plurality of key points based at least on one of: recurring pixels in at least one color filter of the image; a least significant bit of the image; a time domain and a frequency domain of the image. The method further includes interleaving, by the processor, the second encrypted data associated with the error checksum data to the plurality of key points in the image of the product label for securing the product from counterfeiting.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which:

FIG. 4B illustrates a simplified representation of an encrypted data table storing different encrypted data corresponding to one or more different products of a manufacturer, in accordance with another example embodiment of the present disclosure;

Figure 1:
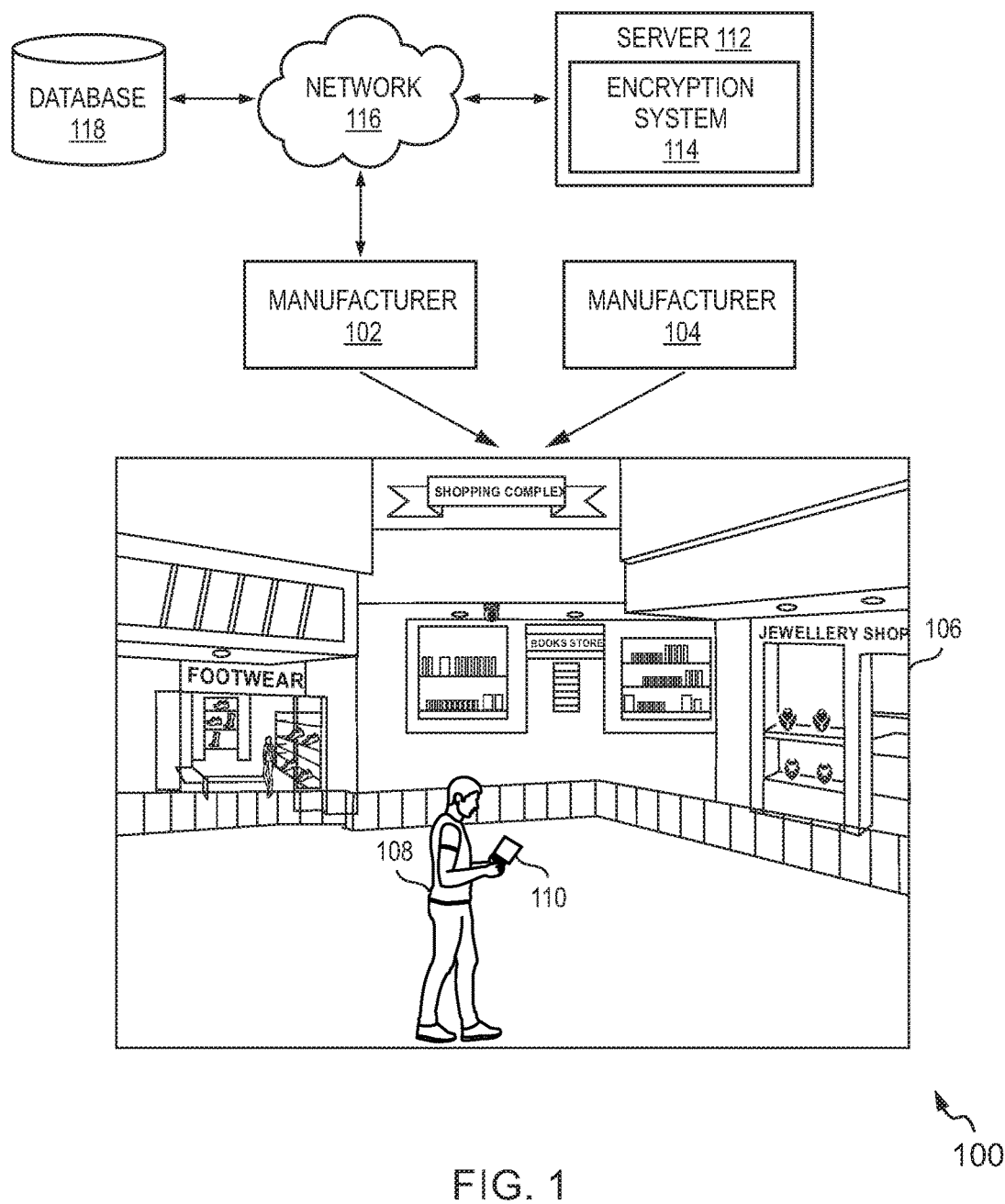
FIG. 1 illustrates an example representation of an environment, in which at least some example embodiments of the present disclosure can be implemented.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various example embodiments of the present disclosure provide methods and systems for providing labels to prevent counterfeiting of products. More specifically, techniques disclosed herein prevent manufacturers from counterfeited products.

In an embodiment, products of a manufacturer can be prevented from counterfeiting by encrypting one or more biometric data for adding to product labels corresponding to products of a manufacturer. In at least one example embodiment, the manufacturer may be associated with a server system that helps in encrypting the one or more biometric data. The server system may host and manage an encryption system for encrypting the one or more biometric data. The encryption system accesses the one or more biometric data of an authorized individual associated with the manufacturer. The one or more biometric data may include fingerprint data, iris pattern, facial pattern, a heart rate data, an electrical activity of skeletal muscles and a deoxyribonucleic acid (DNA) data. In one example scenario, the manufacturer may send the one or more biometric data to the encryption system via web application programming interface (API). In another example scenario, the manufacturer may store the one or more biometric data in a database that is accessible by the encryption system. The encryption system encrypts the one or more biometric data for generating an encrypted data referred to hereinafter as a first encrypted data by using an encryption method. The encryption method referred to hereinafter as first encryption method is selected randomly from a set of encryption methods that are stored in the database. The set of encryption methods may include data encryption standard (DES), Triple DES (3-DES), advanced encryption standard (AES), Honey encryption method, etc.

In one example embodiment, the one or more biometric data can be encrypted by using DES encryption method. From the first encrypted data, the encryption system extracts a biometric pattern. For example, the first encrypted data may be read as byte array. The byte array may include recurring data sequences that are extracted as the biometric pattern. After extracting the biometric pattern, the encryption system generates a product encoded data. The product encoded data is generated by appending the biometric pattern with one or more product identification codes. The one or more product identification codes may include a barcode, a serialization code and a product information of a product. The product information of the product may include, but not limited to, country code, source of product, destination of product, date of transit, shipping information, expiry date, manufacturing date, batch number, etc. The product encoded data is encrypted for generating a second encrypted data by using a different encryption method referred to hereinafter as a second encryption method. The second encryption method is also selected randomly from the set of encryption methods. For example, the product encoded data can be encrypted by using AES encryption method. After generating the second encrypted data, an error checksum data is appended to the second encrypted data. In one example, the error checksum data can be obtained by using a cyclic redundancy check (CRC) checksum method. The error checksum data provide a tamper-proof feature to the second encrypted data. In one example scenario, the error checksum data may help in detecting any modification in the second encrypted data. For instance, counterfeiters may attempt to replicate the second encrypted data for using in product labels of counterfeited products. Moreover, the second encrypted data includes a biometric pattern that is unique and non-replicable. When the counterfeiters attempt to replicate, the second encrypted data may be tampered. The tampered second encrypted data can be detected by the error checksum data.

After appending the error checksum data, a unique identifier of the product is prefixed to the second encrypted data. Furthermore, a key is extracted from the second encrypted data and stored in the database. The key can be used for decrypting the second encrypted data in a verification process. In one example scenario, the manufacturer may perform a quality check or validation of products using the key. In another example scenario, customers who purchase products of the manufacturer may approach the manufacturer for verifying the products from counterfeited products. The second encrypted data is added to a product label of the product for securing the product. The encryption system accesses an image of the product label. In one example embodiment, the image can be retrieved from the database. The encryption system extracts a plurality of key points from the image and interleaves the second encrypted data to the plurality of key points. The plurality of key points from the image may be extracted based at least on recurring pixels in at least one color filter of the image, a least significant bit of the image, a time domain and a frequency domain of the image. The product label with the second encrypted data is printed and attached to the corresponding products. The second encrypted data added to the product label is not visible to human eye that prevents counterfeiters to detect the second encrypted data. The biometric pattern in the second encrypted prevents the counterfeiters from replicating the second encrypted data. In case the second encrypted data is replicated, the error checksum data helps in detecting any tamper in the second encrypted.

The prevention of counterfeiting of products by adding encrypted data to product labels of the products is further explained in detail with reference to FIGS. 1 to 7.

FIG. 1 illustrates an example representation of an environment 100, in which at least some example embodiments of the present disclosure can be implemented. The environment 100 is depicted to include a plurality of manufacturers such as, a manufacturer 102 and a manufacturer 104. Examples of the manufacturer 102 and the manufacturer 104 include, but not limited to, automobile manufacturer, pharmaceutical producer, food producer, hardware manufacturer, agricultural producer, etc. Products manufactured by the manufacturer 102 and the manufacturer 104 may be supplied to various outlets. One of the examples of such outlets may be a shopping complex, such as a shopping complex 106. The shopping complex 106 may also sell products of other manufacturers other than the manufacturer 102 and the manufacturer 104.

A customer 108 may purchase a product 110 from the shopping complex 106. The product 110 may be manufactured by the manufacturer 102. In one example scenario, it may happen that the product 110 may be a counterfeit product. In such scenario, the customer 108 may be unaware that the product 110 purchased is counterfeit. At some point of time, the customer 108 may realize that the product 110 is counterfeit as the product 110 may be of poor quality. The customer 108 may attempt to return the product 110 to the shopping complex 106 and seek customer support. However, the customer 108 may not receive the customer support due to lack of authenticity of the product 110. It may also happen that the shopping complex 106 may be unaware that the product 110 is a counterfeit product. In such a case, the shopping complex 106 may track the manufacturer and may discontinue business with the concerned manufacturer. Consequently, brand and business of the shopping complex 106 or the manufacturer 102 are affected. For instance, the customer 108 may not prefer purchasing further from the shopping complex 106 or the manufacturer 102. In many aspects, customers, manufacturers and intermediates between the manufacturers and the customers are affected due to counterfeiting of products.

In another example scenario, the manufacturer 102 may be producing genuine products that are popular in a market. The manufacturer 104 may produce counterfeited products that are exactly replicated from the genuine products of the manufacturer 102. The replicated products may be supplied to the shopping complex 106. In such scenario, if the replicated products are pharmaceutical or eatable items then it may be life-threatening and health-hazardous. The manufacturer 102 may provide barcodes or labels to protect the products from counterfeiting. However, the manufacturer 104 may replicate those barcodes and labels of the products of the manufacturer 102.

In order to prevent the products of the manufacturer 102 from counterfeiting by counterfeiters, such as the manufacturer 104, the manufacturer 102 may provide product labels that are non-replicable. Moreover, the manufacturer 102 may add encrypted data to the product labels that are non-detectable by human eye. The manufacturer 102 may communicate with a server 112 via a network 116 for securing the product labels. The network 116 may include wired networks, wireless networks and combinations thereof. Some non-limiting examples of the wired networks may include Ethernet, local area networks (LANs), fiber-optic networks, and the like. Some non-limiting examples of the wireless networks may include cellular networks like GSM/3G/4G/5G/LTE/CDMA networks, wireless LANs, Bluetooth, Wi-Fi or Zigbee networks, and the like. An example of the combination of wired and wireless networks may include the Internet.

In one example embodiment, the server 112 accesses one or more biometric data of an authorized individual associated with the manufacturer 102. The one or more biometric data may include, but not limited to, a fingerprint data, an iris pattern, a facial pattern, a heart rate data, an electrical activity of skeletal muscles, and a DNA data. The one or more biometric data may be captured by a device with a camera configured to capture an image, such as a fingerprint scanner, an iris scanner, or any device configured to capture details of an iris or a facial scan. The device may be a wearable device with sensors capable of capturing electrical signals or a heart rate monitor that can input an electrocardiogram (EKG/ECG). The sensors may include an electromyography sensor to capture electrical activity of skeletal muscles. The manufacturer 102 may store the one or more biometric data in a database, such as a database 118 that is accessible by the server 112. In another example embodiment, the manufacturer 102 may send the one or more biometric data to the server 112 using a web application programming interface (API) via the network 116. Moreover, the database 118 also stores one or more product identification codes corresponding to the products of the manufacturer 102. Furthermore, the server 112 includes an encryption system 114 that helps in providing product labels to prevent counterfeiting of the products of the manufacturer 102. The encryption system 114 encrypts the one or more biometric data. The encrypted one or more biometric data is referred to hereinafter as a first encrypted data. The encryption system 114 extracts a biometric pattern from the first encrypted data. The biometric pattern includes one or more recurring data sequences in the first encrypted data. After extracting the biometric pattern, the one or more product identification codes are appended to the biometric pattern for generating a product encoded data. The encryption system 114 encrypts the product encoded data for generating a second encrypted data.

The encryption system 114 generates an error checksum data that is appended to the second encrypted data. The error checksum data helps in providing a tamper-proof feature to the encrypted data. For instance, if a counterfeiter tampers the encrypted data, then the error checksum data helps in detecting any modification to the encrypted data. Moreover, a unique identifier corresponding to the product 110 is pre-fixed to the second encrypted data. Furthermore, a key is generated from the encrypted data and stored in the database 118. The key generated can be used for decrypting the encrypted data for verification purposes by the manufacturer 102. For instance, the manufacturer 102 can use the key during a validation process of the labels of the product. In another scenario, the key can be used for verifying the products even by the consumers. In one example scenario, the manufacturer 102 may perform a quality check or validation of products using the key. In another example scenario, customers who purchase products of the manufacturer 102 may approach the manufacturer 102 for verifying the products from counterfeited products. The second encrypted data is added to a product label of the product for securing the product. The encryption system 114 accesses an image of the product label. In one example embodiment, the image can be retrieved from the database 118. The encryption system 114 extracts a plurality of key points from the image and interleaves the second encrypted data to the plurality of key points. The plurality of key points may be extracted from the image based at least on one of: recurring pixels in at least one color filter of the image; a least significant bit of the image; and a time domain and a frequency domain of the image. The product label with the second encrypted data is printed and attached to the corresponding products. The second encrypted data added to the product label is not visible to human eye that prevents counterfeiters to detect the second encrypted data. The biometric pattern in the second encrypted prevents the counterfeiters from replicating the second encrypted data. In case the second encrypted data is replicated, the error checksum data helps in detecting any tamper in the second encrypted.

After adding the second encrypted data, the product labels are printed and attached to the products of the manufacturer 102. It is noted that the second encrypted data may be added on a package of a product or on the product itself, such as a cap, a bottle, a tube, etc. The second encrypted data added to the product label is non-replicable and non-detectable that helps in preventing the manufacturer 102 from counterfeiting of products. Moreover, the second encrypted data may help in tracking of the products to address parallel imports.

Some example embodiments of adding the second encrypted data to product labels for a product of a manufacturer for securing the product from counterfeiting using the encryption system 114 are explained next with reference to FIG. 2.

Figure 2:
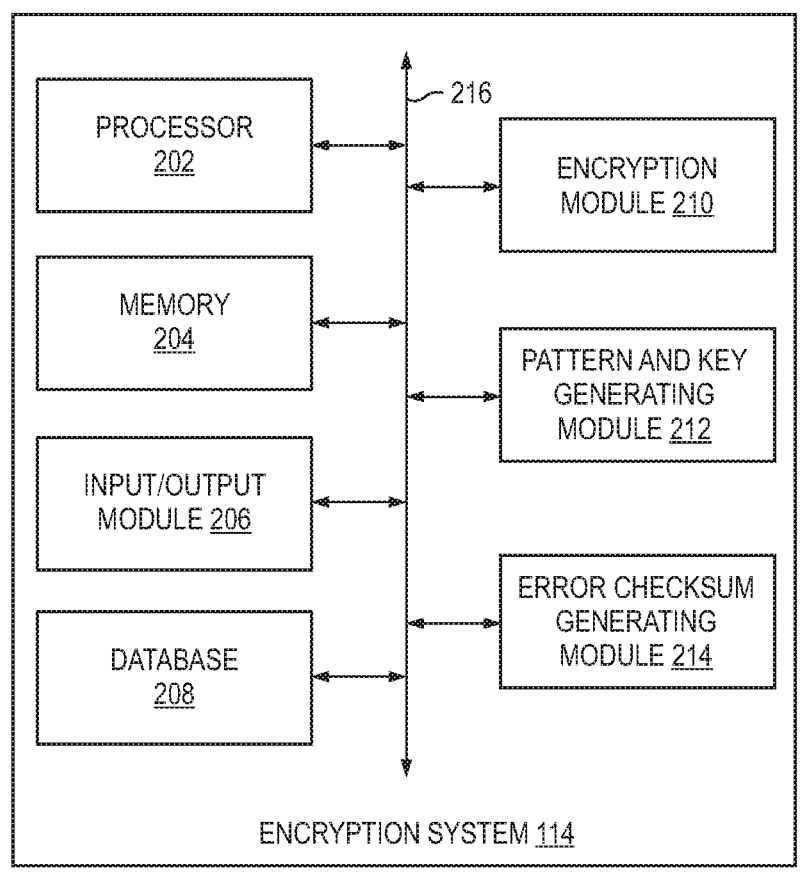
FIG. 2 shows a block diagram representation of an encryption system configured to add encrypted data to product labels corresponding to products of a manufacturer for securing the products from counterfeiting, in accordance with another example embodiment of the present disclosure.

FIG. 2 shows a block diagram representation 200 of the encryption system 114, in accordance with an example embodiment. As described with reference to FIG. 1, the encryption system 114 is configured to add encrypted data to product labels for products of a manufacturer for securing the products from counterfeiting. In some embodiments, the encryption system 114 may be embodied in a server, such as the server 112 described with reference to FIG. 1. In some other embodiments, the encryption system 114 may be a stand-alone system for encrypting the product label. The encryption system 114 includes various processing modules for encrypting the product label. The processing modules described herein may be implemented by combination of hardware and software.

The encryption system 114 is depicted to include a processor 202, a memory 204, an input/output module 206, a database 208, an encryption module 210, a pattern and key generating module 212 and an error checksum generating module 214. It shall be noted that the components are shown for exemplary purposes and the encryption system 114 may include fewer or more modules than those depicted in FIG. 2, for example, two or more components may be embodied in one component or one single component may have multiple sub-components.

In an embodiment, the memory 204 is capable of storing machine executable instructions. The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.).

Further, the processor 202 is capable of executing the machine executable instructions to add encrypted data to the product labels. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processor 202 may be configured to execute hard-coded functionality. In an embodiment, the processor 202 is embodied as an executor of software instructions, wherein the instructions may specifically configure the processor 202 to perform the algorithms and/or operations described herein when the instructions are executed.

In an embodiment, the I/O module 206 may include mechanisms configured to receive inputs from and provide outputs to a manufacturer, such as the manufacturer 102 shown in FIG. 1. To that effect, the I/O module 206 may include at least one input interface and/or at least one output interface. The I/O module 206 accesses one or more biometric data, accesses one or more product identification codes, accesses encryption method from a set of encryption methods, and accesses images of product labels corresponding to the products of the manufacturer 102. In an example, a manufacturer (e.g., the manufacturer 102 in FIG. 1) may send the one or more biometric data to the encryption system 114 via a web API. The encryption system 114 encrypts the one or more biometric data and extracts a biometric pattern from the encrypted one or more biometric data. The biometric data appended with one or more product identification code is encrypted and added to the product label. Examples of the input interface may include, but are not limited to, a keyboard, a mouse, a joystick, a keypad, a touch screen, soft keys, a microphone, and the like. Examples of the output interface may include, but are not limited to, a UI display such as User Interface (such as a light emitting diode display, a thin-film transistor (TFT) display, a liquid crystal display, an active-matrix organic light-emitting diode (AMOLED) display, etc.), a microphone, a speaker, a ringer, a vibrator, and the like.

The database 208 is configured to store one or more biometric data, one or more product identification codes and set of encryption methods for encrypting the one or more biometric data and the one or more product identification codes. The one or more biometric data that include, but not limited to, a fingerprint data, an iris pattern, a facial pattern, a heart rate, an electrical activity of skeletal muscles and a Deoxyribonucleic Acid (DNA) data. The one or more product identification codes include a barcode, a serialization code and a product information corresponding to products of a manufacturer. The product information corresponding to the products may further include a country of origin, a source, a generic name, a strength, an expiry date, a manufacturing date, a batch number, a date of transaction, a shipping information, a destination country, etc., that may help in tracking and tracing of the products. The set of encryption methods includes encryption techniques, such as Advanced Encryption Standard (AES), Data Encryption Standard (DES), Triple-Data Encryption Standard (3-DES), Honey Encryption, etc. In one example embodiment, the database 208 may store images corresponding to product labels of the products.

The encryption module 210 encrypts the one or more biometric data. The one or more biometric data is encrypted for generating a first encrypted data by using a first encryption method. The first encryption method is selected randomly from a set of encryption methods. From the first encrypted data, a biometric pattern is extracted by the pattern and key generating module 212. In one example embodiment, the pattern and key generating module 212 reads the first encrypted data as byte arrays. From the byte arrays, the pattern and key generating module 212 extracts one or more recurring data sequences in the byte arrays that form the biometric pattern. In an example embodiment, the encryption module 210 and the pattern and key generating module 212 are one single module.

Furthermore, the one or more product identification codes are appended to the biometric pattern for generating a product encoded data of a product. The encryption module 210 encrypts the product encoded data by using a second encryption method. The second encrypted method is selected randomly from the set of encryption methods. It must be noted that the first encryption method is different from the second encryption method. In one example scenario, the one or more biometric data is encrypted using Data Encryption Standard (DES) encryption method and the product encoded data is encrypted using Advanced Encryption Standard (AES) encryption method.

The pattern and key generating module 212 also extracts a key from the second encrypted data. In one example, the key can be used for decrypting the second encrypted data in a verification process. The key is stored and maintained in the database 208 that can be used in the verification process.

The error checksum generating module 214 generates an error checksum data from the second encrypted data. The error checksum data is appended to the second encrypted data. In one example, the error checksum data helps in providing a tamper-proof feature to the second encrypted data. For example, in a transit or storage of products, counterfeiters may attempt to replicate the product labels of the products. In one case, the counterfeiters may detect presence of the second encrypted data in the product labels. However, the counterfeiters may not realize that the biometric pattern in the second encrypted data is unique and non-replicable. While attempting to replicate, the second encrypted data in the product labels may be tampered. In such a scenario, the error checksum data helps in detecting any modification in the second encrypted data. After appending the error checksum data, a unique identifier corresponding to the product is prefixed to the second encrypted data. In one example, the processor 202 may access the unique identifier that may be stored in the database 208.

The second encrypted data is added to the product label of the product. In one example embodiment, the processor 202 accesses an image of the product label that may be stored in the database 208. From the image, a plurality of key points is extracted by the pattern and key generating module 212.

The pattern and key generating module 212 may be configured to perform a pool of different pre-defined key point identification methods that helps in generating the plurality of key points from the image. Moreover, generating the plurality of key points may be customized. For instance, the plurality of key points may be generated by using a random method. The random method may be selected from the pool of different pre-defined key point identification methods. The random method used may provide a randomness that may help in ensuring non-replication of products by a counterfeiter.

The pattern and key generating module 212 may read the image as a color image. In one example embodiment, the color image may be a Red, Green, Blue (RGB) image that includes red filter, green filter and blue filter. Out of three color filters, at least one color filter is selected and recurring pixels in the at least one color filter are extracted as the plurality of key points. The at least one color filter may include the red filter, the green filter or the blue filter. The plurality of key points provides positions for interleaving with the second encrypted data. In one example embodiment, the second encrypted data may be interleaved to the plurality of key points using pre-trained neural networks, such as deep neural networks. The second encrypted data inserted only to one color filter, such as the red filter, is non-detectable in human visibility spectrum that may be difficult for counterfeiters to detect the second encrypted data easily. In another example embodiment, the plurality of key points may be identified based on least significant bit (LSB) of the image. The second encrypted data may be inserted in the LSB of the image. In yet another example embodiment, the plurality of key points may be identified based on a time domain or a frequency domain of the image. The second encrypted data may be inserted in the time domain or frequency domain of the image.

The various modules of the encryption system 114, such as the processor 202, the memory 204, the I/O module 206, the database 208, the encryption module 210, the pattern and key generating module 212 and the error checksum generating module 214 may be configured to communicate with each other through a centralized circuit system 216. The centralized circuit system 216 may be various devices configured to, among other things, provide or enable communication between the components (202-214) of the encryption system 114. In certain embodiments, the centralized circuit system 216 may be a central printed circuit board (PCB) such as a motherboard, a main board, a system board, or a logic board. The centralized circuit system 216 may also, or alternatively, include other printed circuit assemblies (PCAs) or communication channel media. In some embodiments, the centralized circuit system 216 may include appropriate storage interfaces to facilitate communication between the processor 202 and the memory 204. Some examples of the storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 202 with access to the data stored in the memory 204.

The generation of plurality of key points for interleaving with the second encrypted data are described with reference to FIGS. 3A to 3C.

Figure 3A:
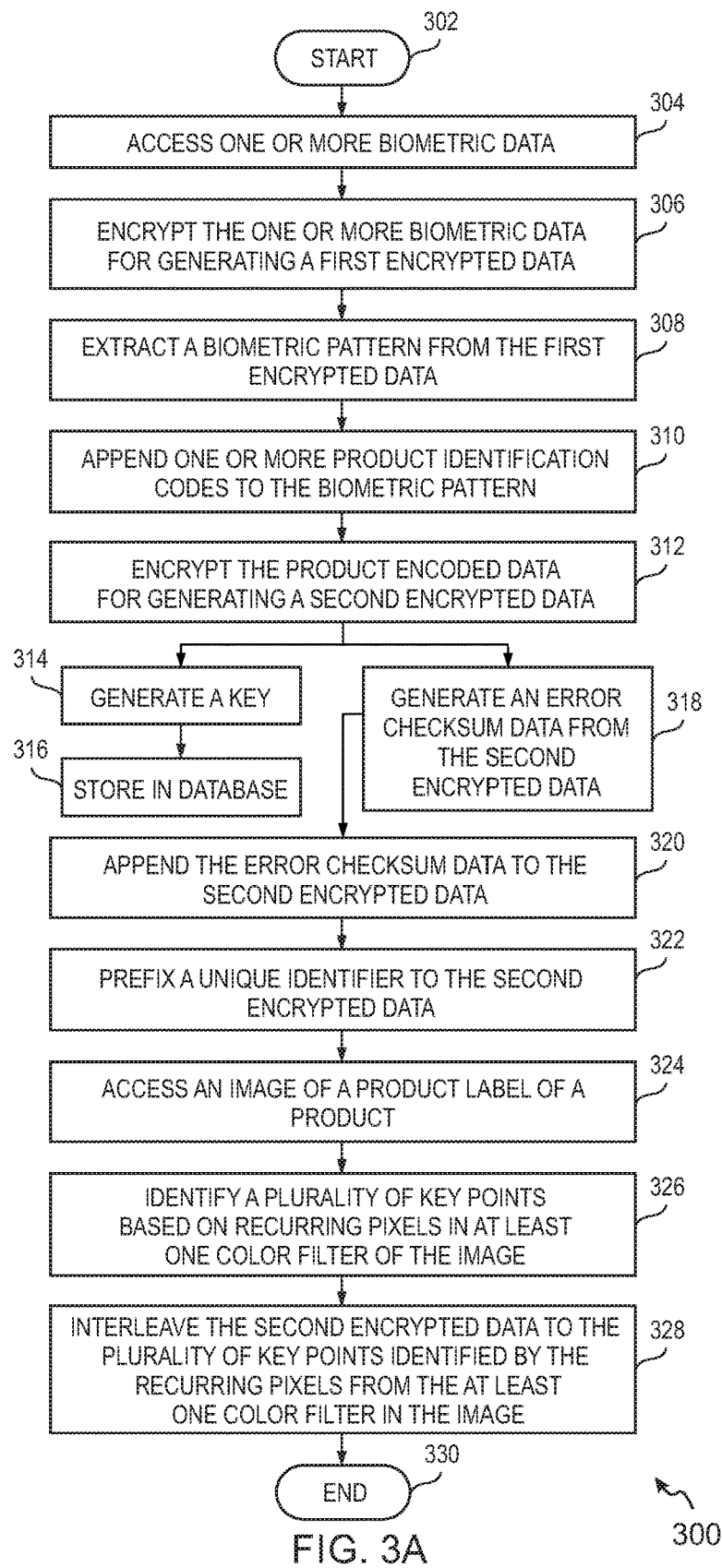
FIG. 3A illustrates a flow chart for adding encrypted data to a product label corresponding to a product of a manufacturer for securing the product from counterfeiting, in accordance with an example embodiment of the present disclosure.

FIG. 3A illustrates a flow chart 300 for adding encrypted data to a product label corresponding to a product of a manufacturer for securing the product from counterfeiting, in accordance with an example embodiment of the present disclosure.

At 302, adding the encrypted data to a product label starts. At 304, one or more biometric data is accessed. In one example, the one or more biometric data is accessed from a database, such as the database 208 described with reference to FIG. 2. The biometric data may be associated with any individual or a group of individuals who are authorized by the manufacturer and/or the distributor of the product.

At 306, the one or more biometric data is encrypted for generating a first encrypted data. The one or more biometric data is encrypted using a first encryption method. The first encryption method is selected randomly from a set of encryption methods that are stored in the database 208. Examples of set of encryption methods include, but are not limited to, data encryption standard (DES), Triple DES (3-DES), advanced encryption standard (AES), and Honey encryption method.

At 308, a biometric pattern is extracted from the first encrypted data. The pattern includes one or more recurring data sequence from the first encrypted data. In one example, the first encrypted data is read as byte arrays. For instance, the byte array is represented as shown below;
first encrypted data:
\x89PNG\r\n\x1a\n\x00\x00\x00\rIHDR\x00\x00\x02\
x00\x00\x......................\x00  IDATx\x9c,\xbc\x07Cb\xe9\
xd2.\xda\x7f\xe6\x9es\xf7\xfe\xbe=31\xa6\xa7\x93\xb91
From the above byte arrays, x00\x00\x00\rIHDR\x00\x00 may be a recurring data sequence in the byte arrays that is extracted as the biometric pattern.

At 310, one or more product identification codes, such as barcode, serialization code and product information of the product are appended to the biometric pattern. The pattern associated with the one or more product identification codes form a product encoded data.

At 312, the product encoded data is encrypted for generating a second encrypted data using a second encryption method. The second encryption method is selected randomly from the set of encryption methods.

At 314, a key is generated from the second encrypted data. In one example, the key can be used in decryption of the second encrypted data for a verification process. At 316, the key is stored in a database, such as the database 208 described with reference to FIG. 2.

At 318, an error checksum data is generated. In one example embodiment, the error checksum data is generated by the error checksum generating module 214 as described with reference to FIG. 2 from the second encrypted data. In one example, the error checksum data can be generated by a method including, but not limited to, a cyclic redundancy check (CRC) method. At 320, the error checksum is appended to the second encrypted data.

At 322, a unique identifier is prefixed to the second encrypted data. The unique identifier corresponds to the product. At 324, an image of a product label of the product is accessed. At 326, a plurality of key points is identified based on recurring pixels in at least one color filter of the image. For example, a red filter of the image may be selected for extracting the recurring pixels. Otherwise, a green filter or a blue filter may be selected for extracting the recurring pixels.

At 328, the second encrypted data is interleaved to the plurality of key points identified by the recurring pixels from the at least one color filter in the image. In one example embodiment, the second encrypted data can be represented as an array, such as a numerical array. For example, the second encrypted data may include data, such as [[6]+[encrypted (2+3+4)]+[5]]. The second encrypted data [[6]+[encrypted (2+3+4)]+[5]] is represented as the numerical array shown below:

numerical array→([−1, −1, −1, 0, . . . , 1, 0, −1, 1])

The numerical array is inserted to locations of the recurring pixels in the image. In one example embodiment, the plurality of key points may be generated from at least one color filter of the image. For example, the image may be a color image that includes red, green and blue layer. Without loss of generality, out of red, green and blue layer, the red layer can be chosen for generating the plurality of key points. At 330, the process for adding the second encrypted data to the product label is completed.

Figure 3B:
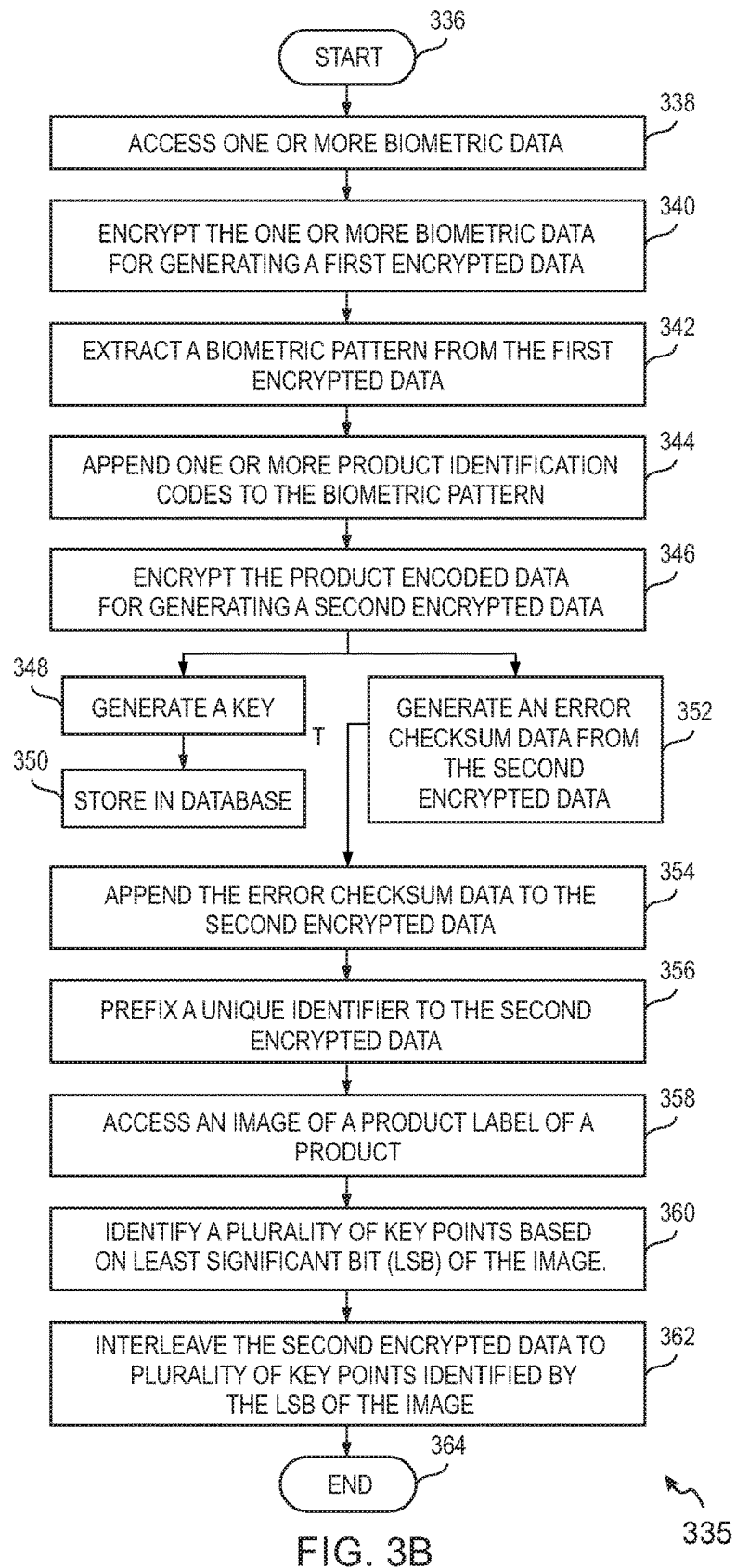
FIG. 3B illustrates a flow chart for adding encrypted data to a product label corresponding to a product of a manufacturer for securing the product from counterfeiting, in accordance with another example embodiment of the present disclosure.

FIG. 3B illustrates a flow chart 335 for adding encrypted data to a product label corresponding to a product of a manufacturer for securing the product from counterfeiting, in accordance with another example embodiment of the present disclosure.

At 336, adding the encrypted data to a product label starts. At 338, one or more biometric data is accessed. At 340, the one or more biometric data is encrypted for generating a first encrypted data. At 342, a biometric pattern is extracted from the first encrypted data. At 344, one or more product identification codes, such as barcode, serialization code and product information of the product are appended to the biometric pattern. At 346, the product encoded data is encrypted for generating a second encrypted data using a second encryption method. At 348, a key is generated from the second encrypted data. At 350, the key is stored in the database 208 described with reference to FIG. 2. At 352, an error checksum data is generated. At 354, the error checksum is appended to the second encrypted data. At 356, a unique identifier is prefixed to the second encrypted data. At 358, an image of a product label of the product is accessed. At 360, a plurality of key points is identified based on least significant bit (LSB) of the image. At 362, the second encrypted data is interleaved to the plurality of key points identified by the LSB of the image. For example, each data bit in a numerical array with data ([−1, −1, −1, 0, . . . , 1, 0, −1, 1]) are inserted to the LSB of the image. At 364, the process for adding the second encrypted data to the product label is completed.

Figure 3C:
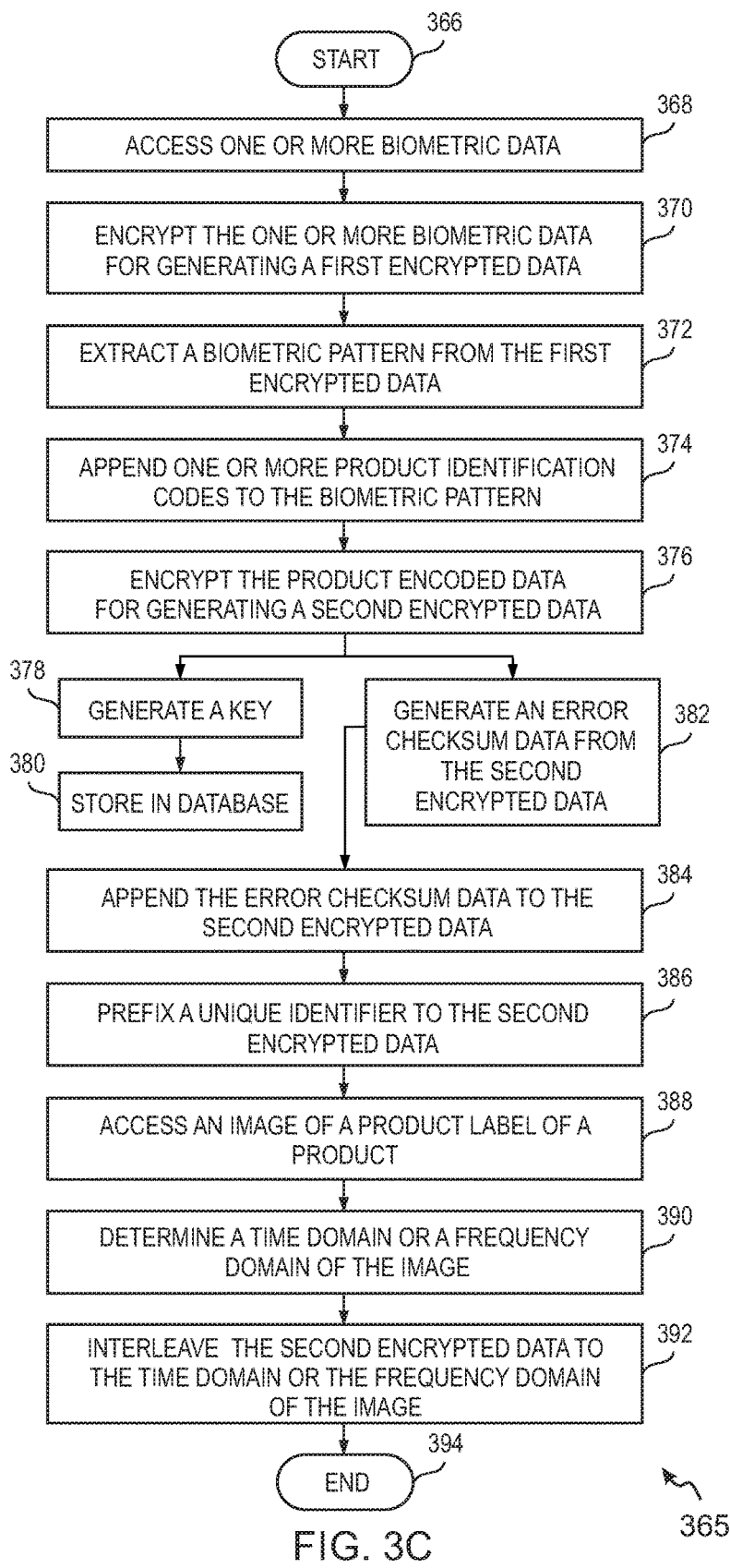
FIG. 3C illustrates a flow chart for adding encrypted data to a product label corresponding to a product of a manufacturer for securing the product from counterfeiting, in accordance with yet another example embodiment of the present disclosure.

FIG. 3C illustrates a flow chart 366 for adding encrypted data to a product label corresponding to a product of a manufacturer for securing the product from counterfeiting, in accordance with yet another example embodiment of the present disclosure.

At 368, adding the encrypted data to a product label starts. At 370, one or more biometric data is accessed. At 370, the one or more biometric data is encrypted for generating a first encrypted data. At 372, a biometric pattern is extracted from the first encrypted data. At 374, one or more product identification codes, such as barcode, serialization code and product information of the product are appended to the biometric pattern. At 376, the product encoded data is encrypted for generating a second encrypted data using a second encryption method. At 378, a key is generated from the second encrypted data. At 380, the key is stored in the database 208 described with reference to FIG. 2. At 382, an error checksum data is generated. At 384, the error checksum is appended to the second encrypted data. At 386, a unique identifier is prefixed to the second encrypted data. At 388, an image of a product label of the product is accessed. At 390, a time domain or a frequency domain of the image is determined. At 392, the second encrypted data is interleaved to the time domain or the frequency domain of the image. For example, a numerical array ([−1, −1, −1, 0, . . . , 1, 0, −1, 1]) are inserted to the time domain or the frequency domain of the image. At 394, the process for adding the second encrypted data to the product label is completed.

The product label with the second encrypted data is printed and attached to the product. In one example, the second encrypted data with the unique identifier and the error checksum data may be organized in a data format as described with an exemplary representation in FIG. 4A.

Figure 4A:
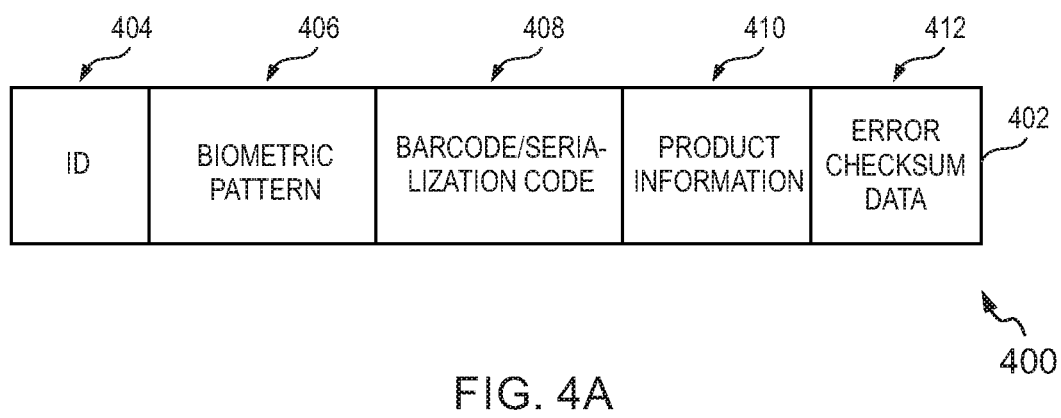
FIG. 4A illustrates an exemplary representation of an encrypted data format for an encrypted data, in accordance with an example embodiment of the present disclosure.

Referring now to FIG. 4A, an exemplary representation 400 of an encrypted data format 402 for an encrypted data referred to herein as second encrypted data is illustrated, in accordance with an example embodiment of the present disclosure. The data format 402 of the second encrypted data includes a unique identifier 404 referred to hereinafter as ID 404, a biometric pattern 406, a barcode/serialization code 408, a product information 410 and an error checksum data 412 corresponding to a product, such as the product 110 as described with reference to FIG. 1. The ID 404 is a unique identifier of the product 110. The biometric pattern 406 is a non-replicable and non-detectable pattern that is extracted from an encrypted one or more biometric data referred to herein as first encrypted data. In one example, the biometric pattern 406 is an authorized biometric pattern that is obtained from an authorized individual associated with a manufacturer (e.g., the manufacturer 102 as described with reference to FIG. 1). The barcode/serialization code 408 includes a machine-readable data that has a description about the product 110. In one example, the barcode may be represented by parallel lines with varying widths and spaces in between the parallel lines. The barcode may be followed by a serialization code that includes a globally unique code. The barcode/serialization code 408 may also include information, such as manufacturing date, expiry date, or batch number of the product 110. The product information 410 may specify type of product, such as medicine, stationery item, hardware, etc. The error checksum data 412 specifies error checking data that may be used for checking any modification in the product, if the product label is tampered.

In one example scenario, a manufacturer (e.g., the manufacturer 102 as shown in FIG. 1) may be producing one or more different products. The one or more different products may include, but not limited to, products such as, soaps, water bottles, pencils or notebooks. The second encrypted data to be added in product labels corresponding to the one or more different products may vary. For example, the second encrypted data for the soaps, the water bottles, the pencils or the notebooks are different.

The manufacturer 102 may maintain different second encrypted data for each different product in a database, such as the database 208 described with reference to FIG. 2. The database 208 may store the different second encrypted data in a table, which is explained next with reference to FIG. 4B.

FIG. 4B illustrates a simplified representation of an encrypted data table 420 storing different encrypted data corresponding to one or more different products of a manufacturer, in accordance with an example embodiment of the present disclosure. It is noted that the encrypted data table 420 is described for a manufacturer (e.g., the manufacturer 102 as shown in FIG. 1) for explanation purpose. However, there may be manufacturers other than the manufacturer 102 with more than one encrypted data table. The encrypted data table 420 includes encrypted data and product related data for different products represented by columns for Products 424, ID 426, biometric pattern 428, barcode/serialization code 430, product information 432 and error checksum data 434.

The Products 424 lists different products, such as Product 1, Product 2, Product 3 and Product N that are represented by rows 436, 438, 440 and 442. A row 436 represents that for the Product 1, ID is 'SM-R01P', biometric pattern is 'x00\x00\rIHDR\x00\x00\x', barcode/serialization is 'SB10973214658', product information is 'soap', and error checksum data is '1'. Likewise, each row represents information uniquely associated with each product.

In one example embodiment, the second encrypted data is added to a product label of a product by interleaving the second encrypted data to a plurality of key points in an image of the product label, which is described with reference to FIGS. 5A to 5C.

Figure 5A:
FIG. 5A is an exemplary representation of a product label of a product of a manufacturer, in accordance with an example embodiment of the present disclosure.

Referring now to FIG. 5A an exemplary representation 500 of a product label 502 with encrypted data is illustrated, in accordance with an example embodiment of the present disclosure. As shown in FIG. 5A, the product label 502 includes a content with a text 'PRODUCT label'. It is noted that the content may include, but not limited to, a symbol, a logo, or a design of a product. In one example, the product label 502 is accessed as an image.

Figure 5B:
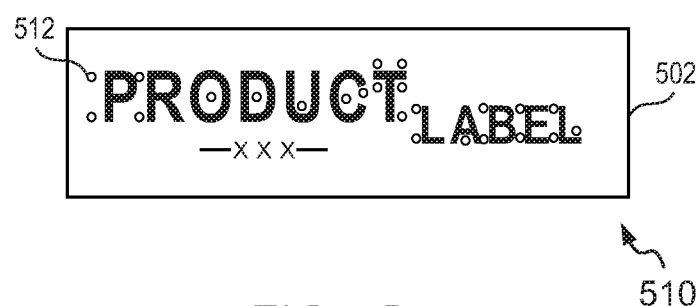
FIG. 5B is an exemplary representation of the product label with a plurality of key points, in accordance with an example embodiment of the present disclosure.

Referring now to FIG. 5B, an exemplary representation 510 of the product label 502 with a plurality of key points 512 is illustrated, in accordance with an example embodiment of the present disclosure. From the image of the product label 502, a plurality of key points 512 is generated as shown in FIG. 5B. In one example embodiment, from the image of the product label 502, the plurality of key points 512 is generated. For instance, the plurality of key points may be generated by using a random method. The random method may be selected from a pool of different pre-defined key point identification methods. The random method used provides a randomness that may help in ensuring non-replication of products by a counterfeiter. The pool of different pre-defined key point identification methods are provided by pattern and key point generating module 212 (shown in FIG. 2).

In another example embodiment, the plurality of key points 512 may be generated based on recurring pixels in the image. For instance, the image of the product label 502 may be a color image (e.g., RGB color image) that may include red, green and blue color filter. At least one color filter, such as red filter may be selected and from the red filter, the recurring pixels may be selected as the plurality of key points 512. In yet another example embodiment, the plurality of key points 512 may be generated by using deep neural networks. The deep neural networks may be pre-trained to identify suitable methods for each specified image.

Figure 5C:
FIG. 5C is an exemplary representation of the product label with encrypted data, in accordance with an example embodiment of the present disclosure.

Referring now to FIG. 5C, an exemplary representation 520 of the product label 502 with encrypted data is illustrated, in accordance with an example embodiment of the present disclosure. The encrypted data (second encrypted data) includes a product encoded data that is encrypted. The product encoded data includes a biometric pattern obtained from an encrypted one or more biometric pattern (first encrypted data) appended with one or more product identification codes corresponding to the product of a manufacturer. The encrypted data is then interleaved in the plurality of key points 512. The product label 502 with the encrypted data is non-detectable in human visibility spectrum as shown in FIG. 5C.

Figure 6A:
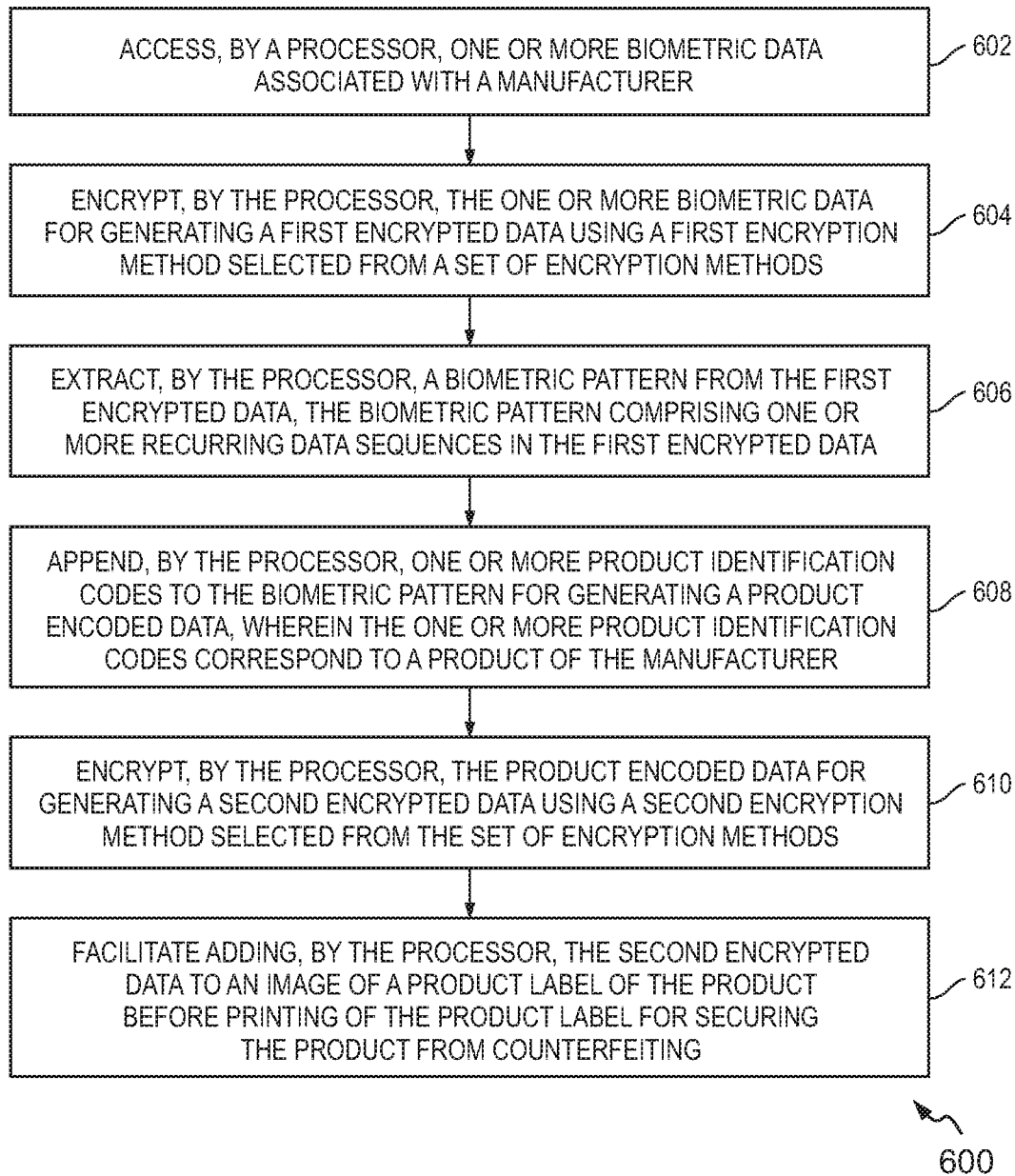
FIG. 6A shows a flow diagram depicting a method for adding encrypted data in a product label corresponding to a product of a manufacturer for securing the product from counterfeiting, in accordance with an example embodiment of the present disclosure.

FIG. 6A shows a flow diagram depicting a method 600 for adding encrypted data in a product label corresponding to a product of a manufacturer for securing the product from counterfeiting, in accordance with an example embodiment of the present disclosure. The method 600 depicted in the flow diagram may be executed by, for example, the server 112 or the encryption system 114. Operations of the method 600 and combinations of operation in the flow diagram, may be implemented by, for example, hardware, firmware, a processor, circuitry and/or a different device associated with the execution of software that includes one or more computer program instructions. The method 600 starts at operation 602.

At operation 602, the method includes accessing, by a processor, one or more biometric data associated with a manufacturer. In one example embodiment, the one or more biometric data includes one or more of a fingerprint data, an iris pattern, a facial pattern, a heart rate data, an electrical activity of skeletal muscles and a deoxyribonucleic acid (DNA) data. In one example, the manufacturer (e.g., the manufacturer 102 as shown in FIG. 1) may provide the one or more biometric data to the server 112 via a web application programming interface (API). In another example, the manufacturer may store the one or more biometric data in a database (e.g., the database 118 as shown in FIG. 1) that is accessible by the server 112.

At operation 604, the method includes encrypting, by the processor, the one or more biometric data for generating a first encrypted data using a first encryption method selected from a set of encryption methods. The set of encryption method may include, but not limited to, AES, DES, 3-DES, Honey encryption method, etc. In one example embodiment, the first encryption method is selected randomly from the set of encryption methods that are stored in a database (e.g., the database 118 as shown in FIG. 1). For instance, the one or more biometric data can be encrypted by using DES encryption method.

At operation 606, the method includes extracting, by the processor, a biometric pattern from the first encrypted data, the biometric pattern comprising one or more recurring data sequences in the first encrypted data. In one example embodiment, the first encrypted data is read as a byte array. For instance, the byte array may be represented as '\x89PNG\r\n\x1a\n\x00\x00\x00\rIHDR\x00\x00\x02\ x00\x00\x . . . \x00IDATx\x9c\xbc\x07Cb\xe9\xd2\xda\x71\ xe6\x9es\xf7\xfe\xbe=3{\xa6\xa7\x93\xb91'. From the byte array, the one or more recurring data sequences, such as 'x00\x00\rIHDR\x00\x00\x' is extracted as the biometric pattern.

At operation 608, the method includes appending, by the processor, one or more product identification codes to the biometric pattern for generating a product encoded data, wherein the one or more product identification codes correspond to a product of the manufacturer. In one example embodiment, the one or more product identification codes include, but not limited to, barcode, serialization code and product information of the product. For instance, the one or more product identification codes may provide information that describes about the product, such as a manufacturing date, an expiry date, a tracking information, country code, source of product, destination of product, a date of transit, a shipping information, a batch number, etc.

At operation 610, the method includes encrypting, by the processor, the product encoded data for generating a second encrypted data using a second encryption method selected from the set of encryption methods. The second encryption method is selected randomly from the set of encryption methods. It must be noted that the first encryption method and the second encryption are different. In one example, the product encoded data can be encrypted by using AES encryption method. After generating the second encrypted data, an error checksum data is appended to the second encrypted data. For instance, the error checksum data may be generated from the second encrypted data by using cyclic redundancy check method. In one example, the error checksum data helps in providing a tamper-proof to the second encrypted data. After appending the error checksum data to the second encrypted data, a unique identifier corresponding to the product is prefixed to the second encrypted data. Moreover, from the second encrypted data, a key is extracted and stored in a database, such as the database 118 as shown in FIG. 1. The key can be used for decrypting the second encrypted data in a verification process that may be performed by the manufacturer. In another scenario, a customer may approach the manufacturer for checking authenticity of the product. In such scenario, the key may be used for checking the authenticity of the product.

At operation 612, the method includes facilitating adding, by the processor, the second encrypted data to an image of a product label of the product before printing of the product label for securing the product from counterfeiting. In one example embodiment, the product label may be accessed as an image. From the image a plurality of key points is generated. The plurality of key points may be generated based at least on recurring pixels in at least one color filter of the image, a least significant bit (LSB) of the image, a time domain and a frequency domain of the image. For instance, the image may be a color image, such as RGB image. The RGB image may be read into red, green and blue filter and at least one filter, such as red filter may be selected. From the red filter of the image, the recurring pixels constituting the plurality of key points are generated for interleaving with the second encrypted data. In one example, the second encrypted data is read as an array, such as a numerical array. For example, the second encrypted data may be acquired as [[6]+[encrypted(2+3+4)]+[5]] that can be represented as the numerical array ([−1, −1, −1, 0, . . . , 1, 0, −1, 1]). The numerical array ([−1, −1, −1, 0, . . . , 1, 0, −1, 1]) is interleaved to the plurality of key points in the image of the product label. After adding the second encrypted data, the product label is printed and attached to the product. The second encrypted data added to the product label is non-detectable by the human eye and non-replicable by counterfeiters. In one example, the plurality of key points may be generated and interleaved with the second encrypted data using pre-trained neural networks, such as deep learning neural networks.

It shall be noted that one or more operations of the method 600 may be grouped together and performed in form of a single step, or one operation may have several sub-steps that may be performed in parallel or in sequential manner.

Figure 6B:
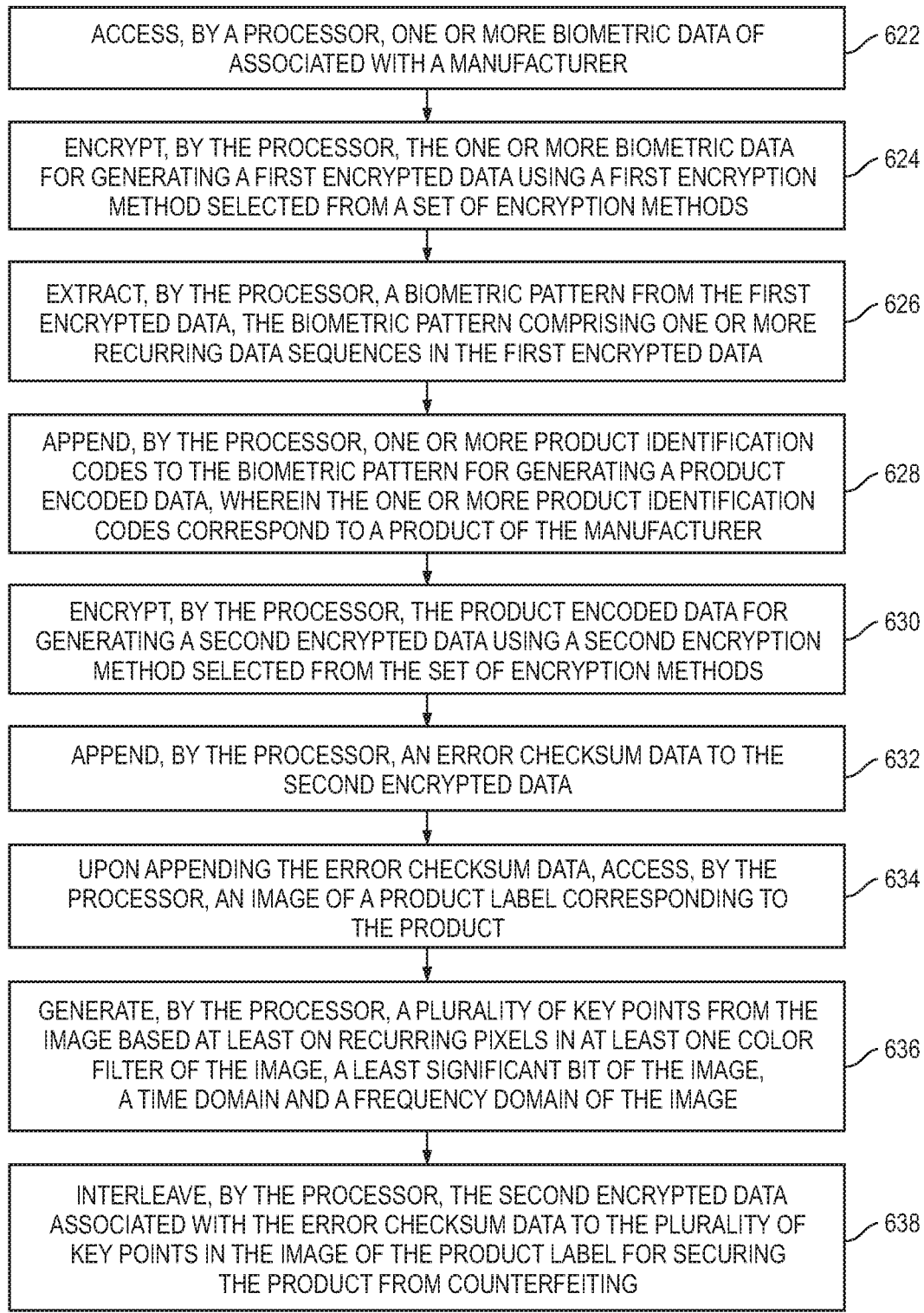
FIG. 6B shows a flow diagram depicting a method for adding encrypted data in a product label corresponding to a product of a manufacturer for securing the product from counterfeiting, in accordance with another example embodiment of the present disclosure.

FIG. 6B shows a flow diagram depicting a method 620 for adding encrypted data in a product label corresponding to a product of a manufacturer for securing the product from counterfeiting, in accordance with another example embodiment of the present disclosure. The method 620 depicted in the flow diagram may be executed by, for example, the server 112 or the encryption system 114. Operations of the method 620 and combinations of operation in the flow diagram, may be implemented by, for example, hardware, firmware, a processor, circuitry and/or a different device associated with the execution of software that includes one or more computer program instructions. The method 620 starts at operation 622.

At operation 622, the method 620 includes accessing, by a processor, one or more biometric data associated with a manufacturer.

At operation 624, the method 620 includes encrypting, by the processor, the one or more biometric data for generating a first encrypted data using a first encryption method selected from a set of encryption methods.

At operation 626, the method 620 includes extracting, by the processor, a biometric pattern from the first encrypted data, the biometric pattern comprising one or more recurring data sequences in the first encrypted data.

At operation 628, the method 620 includes appending, by the processor, one or more product identification codes to the biometric pattern for generating a product encoded data, wherein the one or more product identification codes correspond to a product of the manufacturer.

At operation 630, the method 620 includes encrypting, by the processor, the product encoded data for generating a second encrypted data using a second encryption method selected from the set of encryption methods. Operations 602-610 are have been explained with reference to FIG. 6A and description of the same has been omitted here for the sake of brevity.

At operation 632, the method 620 includes appending, by the processor, an error checksum data to the second encrypted data. For instance, the error checksum data may be generated from the second encrypted data by using cyclic redundancy check method. In one example, the error checksum data helps in providing a tamper-proof to the second encrypted data. After appending the error checksum data to the second encrypted data, a unique identifier corresponding to the product is prefixed to the second encrypted data. Moreover, from the second encrypted data, a key is extracted and stored in a database, such as the database 118 as shown in FIG. 1. The key can be used for decrypting the second encrypted data in a verification process that may be performed by the manufacturer. In another scenario, a customer may approach the manufacturer for checking authenticity of the product. In such scenario, the key may be used for checking the authenticity of the product.

At operation 634, the method 620 includes upon appending the error checksum data, accessing, by the processor, an image of a product label corresponding to a product of the manufacturer. In one example embodiment, the product label may be accessed as an image from the database 118.

At operation 636, the method 620 includes generating, by the processor, a plurality of key points from the image, the plurality of key points based at least on recurring pixels in at least one color filter of the image, a least significant bit of the image, a time domain and a frequency domain of the image. For instance, the image may be a color image, such as RGB image. The RGB image may be read into red, green and blue filter and at least one filter, such as red filter may be selected. From the red filter of the image, the recurring pixels constituting the plurality of key points are generated.

At operation 638, the method 620 includes interleaving, by the processor, the second encrypted data associated with the error checksum data to the plurality of key points in the image of the product label for securing the product from counterfeiting. In one example, the second encrypted data is read as an array, such as a numerical array. For example, the second encrypted data may be acquired as [[6]+[encrypted (2+3+4)]+[5]] that can be represented as the numerical array ([−1, −1, −1, 0, . . . , 1, 0, −1, 1]). The numerical array ([−1, −1, −1, 0, . . . , 1, 0, −1, 1]) is interleaved to the plurality of key points in the image of the product label. In one example, the numerical array is interleaved to recurring pixels in at least one color filter of the image. In another example, the numerical array is interleaved to LSB of the image. In yet another example, the numerical array is interleaved to a time domain or a frequency domain of the image. After adding the second encrypted data, the product label is printed and attached to the product. The second encrypted data added to the product label is non-detectable by the human eye and non-replicable by counterfeiters.

Figure 7:
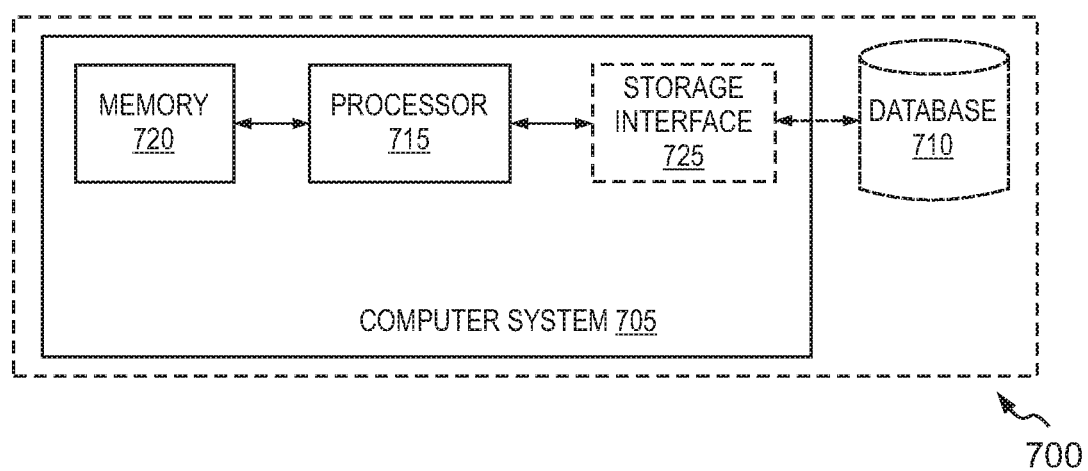
FIG. 7 is a simplified block diagram of a server system for adding encrypted data in a product label corresponding to a product of a manufacturer for securing the product from counterfeiting, in accordance with an example embodiment of the present disclosure.

FIG. 7 is a simplified block diagram of a server 700 capable of implementing at least some embodiments of the present disclosure. An example of the server 700 is the server 112 shown and described with reference to FIG. 1. The server 700 includes a computer system 705 and a database 710. The computer system 705 includes at least one processor 715 for executing instructions. Instructions may be stored in, for example, but not limited to, a memory 720. The processor 715 may include one or more processing units (e.g., in a multi-core configuration).

The processor 715 is operatively coupled to the database 710. The database 710 is any computer-operated hardware suitable for storing and/or retrieving data, such as, but not limited to, one or more biometric data, one or more product identification codes, images of product labels, first encrypted data, second encrypted data, biometric patterns, keys and a set of encryption methods that are stored in the database 710. The database 710 may include multiple storage units such as hard disks and/or solid-state disks in a redundant array of inexpensive disks (RAID) configuration. The database 710 may include a storage area network (SAN) and/or a network attached storage (NAS) system.

In some embodiments, the database 710 is integrated within the computer system 705. For example, the computer system 705 may include one or more hard disk drives as the database 710. In other embodiments, the database 710 is external to the computer system 705 and may be accessed by the computer system 705 using a storage interface 725. The storage interface 725 is any component capable of providing the processor 715 with access to the database 710. The storage interface 725 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processor 715 with access to the database 710.

The processor 715 is further configured to perform: access one or more biometric data associated with a manufacturer, encrypt the one or more biometric data for generating a first encrypted data using a first encryption method selected from a set of encryption methods, extract a biometric pattern from the first encrypted data, append one or more product identification codes to the biometric pattern for generating a product encoded data, encrypt the product encoded data for generating a second encrypted data using a second encryption method selected from the set of encryption methods and add the second encrypted data to an image of a product label of a product of the manufacturer before printing of the product label for securing the product from counterfeiting.

The disclosed methods with reference to FIGS. 1 to 7, or one or more operations of the flow diagram 600 or 620 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer, such as a laptop computer, net book, Web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), mobile communications, or other such communication means.

Various embodiments of the disclosure, as discussed above, may be practiced with steps and/or operations in a different order, and/or with hardware elements in configurations, which are different than those which, are disclosed. Therefore, although the disclosure has been described based upon these exemplary embodiments, it is noted that certain modifications, variations, and alternative constructions may be apparent and well within the spirit and scope of the disclosure.

Although various exemplary embodiments of the disclosure are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method, comprising:
accessing, by a processor, one or more biometric data associated with a manufacturer;
encrypting, by the processor, the one or more biometric data for generating a first encrypted data using a first encryption method selected from a set of encryption methods;
extracting, by the processor, a biometric pattern from the first encrypted data, the biometric pattern comprising one or more recurring data sequences in the first encrypted data;
appending, by the processor, one or more product identification codes to the biometric pattern for generating a product encoded data, wherein the one or more product identification codes correspond to a product of the manufacturer;
encrypting, by the processor, the product encoded data for generating a second encrypted data using a second encryption method selected from the set of encryption methods; and
facilitating adding, by the processor, the second encrypted data to an image of a product label of the product before printing of the product label for securing the product from counterfeiting.

2. The method as claimed in claim 1, further comprising:
generating, by the processor, an error checksum data for the second encrypted data; and
appending, by the processor, the error checksum data to the second encrypted data.

3. The method as claimed in claim 1, further comprising:
prefixing, by the processor, a unique identifier to the second encrypted data, wherein the unique identifier corresponds to the product.

4. The method as claimed in claim 1, wherein generating the second encrypted data further comprises:
extracting, by the processor, a key from the second encrypted data; and
storing, by the processor, the key in a database.

5. The method as claimed in claim 1, wherein adding the second encrypted data further comprises:
acquiring, by the processor, the second encrypted data as an array; and
inserting, by the processor, the array to the product label.

6. The method as claimed in claim 5, wherein inserting the array further comprises:
accessing, by the processor, an image corresponding to the product label;
generating, by the processor, a plurality of key points from the image based one at least one of:
recurring pixels in at least one color filter of the image;
a least significant bit of the image; and
a time domain and a frequency domain of the image; and
interleaving, by the processor, the array to the plurality of key points in the image.

7. The method as claimed in claim 1, wherein the first encryption method is randomly selected from the set of encryption methods.

8. The method as claimed in claim 1, wherein the second encryption method is randomly selected from the set of encryption methods.

9. The method as claimed in claim 1, wherein the one or more biometric data comprise one or more of:
a fingerprint data;
an iris pattern;
a facial pattern;
a heart rate data;
an electrical activity of skeletal muscles; and
a deoxyribonucleic acid (DNA) data.

10. The method as claimed in claim 1, wherein the one or more product identification codes comprise:
a barcode;
a serialization code; and
a product information of the product.

11. A server system comprising:
a memory comprising stored instructions; and
a processor configured to execute the stored instructions to cause the encryption system to perform:
accessing one or more biometric data associated with a manufacturer;
encrypting the one or more biometric data for generating a first encrypted data using a first encryption method selected from a set of encryption methods;
extracting a biometric pattern from the first encrypted data, the biometric pattern comprising one or more recurring data sequences in the first encrypted data;
appending one or more product identification codes to the biometric pattern for generating a product encoded data, wherein the one or more product identification codes correspond to a product of the manufacturer;
encrypting the product encoded data for generating a second encrypted data using a second encryption method selected from the set of encryption methods; and
facilitating adding the second encrypted data to an image of a product label of the product before printing of the product label for securing the product from counterfeiting.

12. The server system as claimed in claim 11, wherein the processor is further configured to perform:
generating an error checksum data, the error checksum data for the second encrypted data; and
appending the error checksum data to the second encrypted data.

13. The server system as claimed in claim 11, wherein the processor is further configured to perform:
prefixing, by the processor, a unique identifier to the second encrypted data, wherein the unique identifier corresponds to the product.

14. The server system as claimed in claim 11, wherein for generating the second encrypted data the processor is configured to perform:
extracting a key from the second encrypted data; and
storing the key in a database.

15. The server system as claimed in claim 11, wherein for adding the second encrypt the processor is configured to perform:
acquiring the second encrypted data as an array; and
inserting the array to the product label.

16. The server system as claimed in claim 15, wherein for inserting the array the processor is configured to perform:
accessing an image of the product label;
generating a plurality of key points from the image based one at least one of:
recurring pixels in at least one color filter of the image;
a least significant bit of the image; and
a time domain and a frequency domain of the image; and
interleaving the array to the plurality of key points in the image.

17. The server system as claimed in claim 11, wherein the one or more biometric data comprise one or more of:
a fingerprint data;
an iris pattern;
a facial pattern;
a heart rate data;
an electrical activity of skeletal muscles; and
a deoxyribonucleic acid (DNA) data.

18. A method comprising:
accessing, by a processor, one or more biometric data associated with a manufacturer;
encrypting, by the processor, the one or more biometric data for generating a first encrypted data using a first encryption method selected from a set of encryption methods;
extracting, by the processor, a biometric pattern from the first encrypted data, the biometric pattern comprising one or more recurring data sequences in the first encrypted data;
appending, by the processor, one or more product identification codes to the biometric pattern for generating a product encoded data, wherein the one or more product identification codes correspond to the product of the manufacturer;
encrypting, by the processor, the product encoded data for generating a second encrypted data using a second encryption method selected from the set of encryption methods;
appending, by the processor, an error checksum data to the second encrypted data; upon appending the error checksum data, accessing, by the processor, an image of a product label corresponding to the product;

generating, by the processor, a plurality of key points from the image based at least one of: recurring pixels in at least one color filter of the image; a least significant bit of the image; a time domain and a frequency domain of the image; and interleaving, by the processor, the second encrypted data associated with the error checksum data to the plurality of key points in the image of the product label for securing the product from counterfeiting.

19. The method as claimed in claim 18, wherein generating the plurality of key points further comprises:

selecting, by the processor, at least one color filter from the image; and generating, by the processor, the recurring pixels in the at least color filter of the image.

20. The method as claimed in claim 18, wherein interleaving the second encrypted data further comprises:

acquiring, by the processor, the second encrypted data as an array; and inserting, by the processor, the array to the product label.

\* \* \* \* \*